US006672348B2

(12) United States Patent
Ransom et al.

(10) Patent No.: US 6,672,348 B2
(45) Date of Patent: Jan. 6, 2004

(54) EXPANDABLE PORTABLE TABLE FOR PORTABLE SAW

(76) Inventors: Desmond L. Ransom, 12710 North St., P.O. Box 133, Dillsboro, IN (US) 47108; Dana Bascom, 304 Walker Ave., Lawrenceburg, IN (US) 47025

( * ) Notice: Subject to any disclaimer, the term of this patent is extended or adjusted under 35 U.S.C. 154(b) by 86 days.

(21) Appl. No.: 09/994,528

(22) Filed: Nov. 27, 2001

(65) Prior Publication Data

US 2003/0097920 A1 May 29, 2003

(51) Int. Cl.[7] ............................................. B25H 1/100
(52) U.S. Cl. ....................... 144/287; 83/167; 83/471.3; 83/472; 144/286.5
(58) Field of Search .................. 83/471.3, 167, 83/472, 473, 438, 471; 144/287, 286.1, 286.5, 253.1–253.9

(56) References Cited

U.S. PATENT DOCUMENTS

| | | | | |
|---|---|---|---|---|
| 4,151,925 A | * | 5/1979 | Glassmeyer | 220/1.5 |
| 4,798,113 A | | 1/1989 | Viazanko | |
| 4,860,807 A | * | 8/1989 | Vacchiano | 144/286.1 |
| 5,038,650 A | * | 8/1991 | Hodge | 83/471.3 |
| 5,105,862 A | * | 4/1992 | Skinner et al. | 144/287 |
| 5,193,598 A | | 3/1993 | Estrem | |
| 5,320,150 A | * | 6/1994 | Everts et al. | 144/287 |
| 5,421,231 A | | 6/1995 | Break et al. | |
| 5,461,953 A | * | 10/1995 | McCormick | 83/36 |
| 5,497,816 A | * | 3/1996 | Darland | 144/287 |
| 5,518,053 A | * | 5/1996 | Robison | 144/286.1 |
| 5,526,856 A | * | 6/1996 | Pedri | 144/287 |
| 5,570,957 A | * | 11/1996 | Kuly et al. | 384/42 |
| 5,592,981 A | | 1/1997 | Derecktor | |
| RE35,627 E | | 10/1997 | Estrem | |
| 5,782,279 A | | 7/1998 | Stecker, Sr. | |
| 5,836,365 A | | 11/1998 | Derecktor | |
| 5,882,155 A | * | 3/1999 | Testa, Jr. | 409/132 |
| 5,979,523 A | * | 11/1999 | Puzio et al. | 144/286.5 |
| 6,161,459 A | * | 12/2000 | Ceroll et al. | 83/468 |

* cited by examiner

Primary Examiner—Allan N. Shoap
Assistant Examiner—Phung Nguyen
(74) Attorney, Agent, or Firm—Wood, Herron & Evans, L.L.P.

(57) ABSTRACT

A portable saw table for supporting a portable saw. The portable saw table has a base supporting a plate slidably mountable thereon, and the portable saw is attached to the plate. An adjustable work support is mounted on the base adjacent the plate, and an extendable work support is slidably mounted with respect to the base. Linear guides mounted between the base and the plate properly locate the plate with respect to the adjustable work support, thereby permitting a saw fence to be aligned with a vertical guide surface on the adjustable work support. A locking device is used to secure the plate at its aligned position. The adjustable work support is movable lengthwise to align a horizontal work surface immediately adjacent a saw table, and the adjustable work support is also movable in a vertical direction so that it is coplanar with the saw table. The extendable work support is movable in three mutually perpendicular directions to align it with the adjustable work support. An extendable end support is movable lengthwise and vertically with respect to the extendable work support.

30 Claims, 4 Drawing Sheets

EXPANDABLE PORTABLE TABLE FOR PORTABLE SAW

FIELD OF THE INVENTION

This invention relates to portable tables and, more particularly, to an expandable portable table for supporting a portable saw.

BACKGROUND OF THE INVENTION

There are many applications for portable saws at construction sites and in workshops and manufacturing facilities. Many of such portable saws, for example, miter and cutoff saws, are mounted to a frame that also has a table, that is, a generally horizontal work supporting surface, and a fence, that is, a generally vertical work guiding surface. Portable miter saws are often used to cut interior and exterior trim, for example, base boards, toe strips, various trim moldings, etc; and such pieces are often very long, for example, about 8–10 feet or more. While it is easy to place the portable saw on a saw horse, workbench or other table, the length of the workpieces being cut make such a placement impractical. Therefore, such portable saws are often placed on the floor or ground, so that the very long workpieces can also be supported by the floor or ground surface. Thus, the users of the such portable saws are often working on their knees which is difficult and undesirable.

Various portable saw tables are known. Some known portable saw tables are designed to be attached to, or be clamped on, a base such as a portable workbench, saw horse, etc. While such tables are functional, the portability of such tables also requires the portability or existence at each worksite of the necessary workbench or saw horse. If not available, the saw horse must then be constructed. Therefore, such portable saw table designs have the disadvantage of being incomplete, that is, requiring other structure for their functionality; and such other structure may or may not be available.

Other portable saw table designs are known in which the base is an integral part of the saw table, and no other base piece is required. Some of such designs are made to accept portable circular saws and include adjustable guides that permit the portable circular saw to accurately and repeatably cut angles. Such saw tables while being fully self contained are relatively complex, expensive and often difficult to transport to a job site and set up.

Consequently, there is a need for a portable saw table that is fully self contained, accepts a variety of makes and models of miter saws, is easy to set up and use and is capable of handling long workpieces.

SUMMARY OF THE INVENTION

The present invention provides a compact, flexible, light weight and easy to use portable saw table for mounting a portable saw. The portable saw table of the present invention permits a saw to be mounted, adjusted, removed and then remounted at exactly the same position, thereby making the saw table convenient and easy to use. Further, the saw table of the present invention permits different makes and models of saws to be used, thus making it more flexible and valuable. In addition, the saw table of the present invention folds into a very compact package for easy transportation to different work sites. The saw table is also expandable at both ends to permit long workpieces to be easily supported and accurately and repeatably cut. The saw table of the present invention is especially useful in both commercial and residential construction environments for cutting interior and exterior trim, siding, conduit, pipe, etc.

According to the principles of the present invention and in accordance with the described embodiments, the invention provides a portable saw table for supporting a portable saw. The portable saw table has a base supporting a plate removably mountable on the base. The portable saw is attached to the plate. An adjustable work support is mounted on the base adjacent the plate, and an extendable work support is slidably mounted with respect to the base. The use of the removable plate provides a common mechanical interface for using different portable saws. The plate permits the portable saw to be easily and quickly mounted on, and removed from, the saw table and does not impair the use of the portable saw when not mounted on the saw table.

In one aspect of this invention, linear guides are mounted between the base and the plate to properly locate the plate with respect to the adjustable work support. Further, the linear guides permit the plate to be moved to align a saw fence with a vertical guide surface on the adjustable work support. In addition, a locking device is used to secure the plate at its aligned position.

In an another aspect of the invention, the adjustable work support is movable lengthwise to align a horizontal adjustable work surface immediately adjacent a saw table. The adjustable work support is also movable in a vertical direction so that it can be made coplanar with the saw table.

In a further aspect of the invention, the extendable work support is movable in a horizontal direction perpendicular to a length of the base to align an extendable fence on the extendable work support with the vertical guide surface of the adjustable work support. The extendable work support is also movable in a vertical direction so that it can be made coplanar with the adjustable work support.

In a still further aspect of the invention, an extendable end support is movable lengthwise and vertically with respect to the extendable work support.

These and other objects and advantages of the present invention will become more readily apparent during the following detailed description taken in conjunction with the drawings herein.

DETAILED DESCRIPTION OF THE INVENTION

Figure 1:
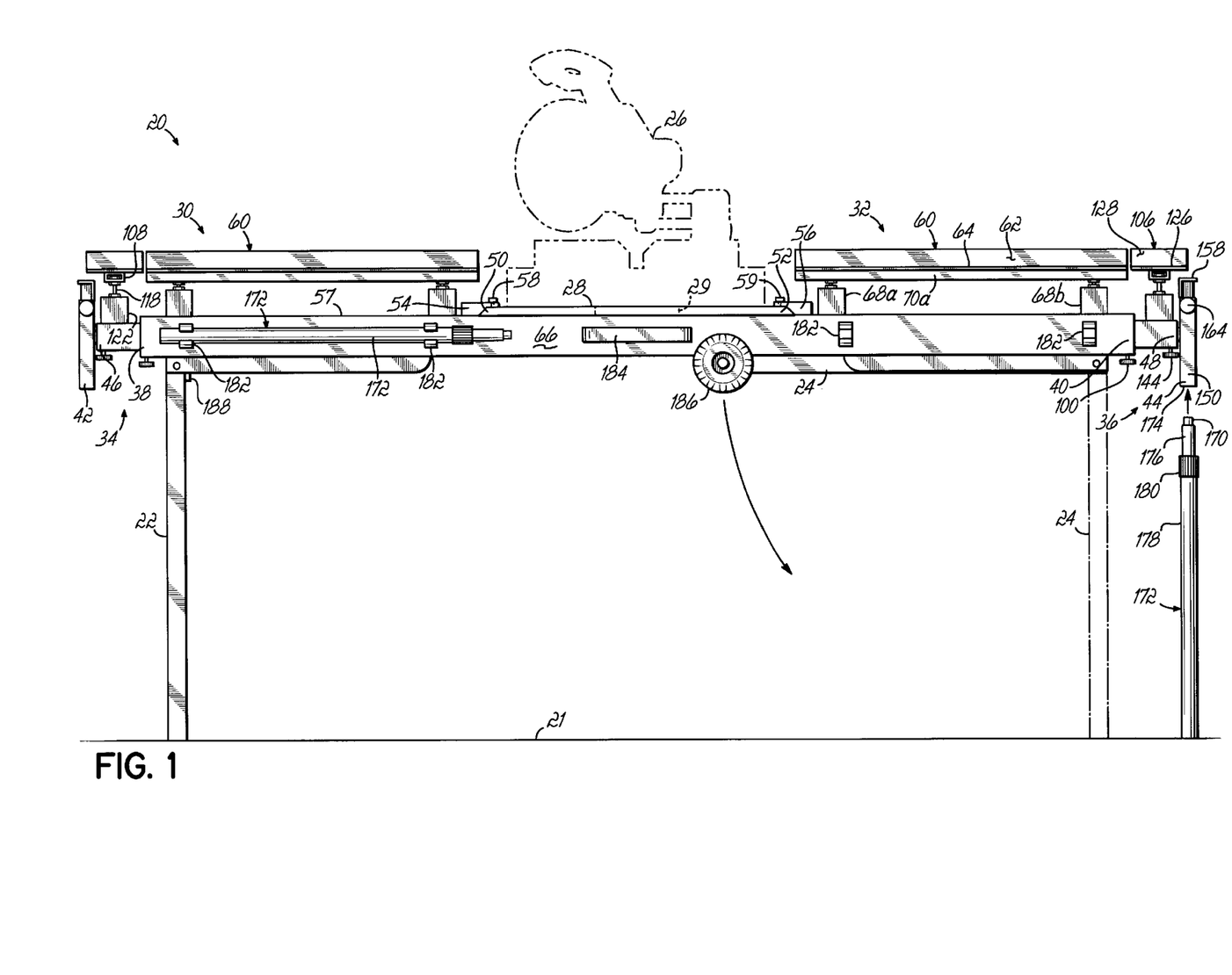
FIG. 1 is a front elevation view of the portable saw table in accordance with the principles of the present invention.

Referring to FIG. 1, a saw table 20 is supported on the ground, a floor or other surface 21 by two pairs of legs 22, 24. A portable saw as shown in phantom at 26, for example, a miter or cutoff saw, is attached to a mounting or support plate 28 that, in turn, is removably mountable on the saw table 20. Left and right workpiece supports 30, 32, respectively, are mounted adjacent each side of the support plate 28. Left and right extendable workpiece supports 34, 36 are slidably mounted to respective left and right ends 38, 40 of the saw table 20. Left and right extendable end supports 42, 44 are slidably mounted with respect to the distal ends 46, 48 of the respective left and right extendable workpiece supports 34, 36.

The saw table 20 is used with a portable saw 26, for example, a miter saw or a cutoff saw. Such saws are often mounted on a frame that provides a saw table, that is, a horizontal work support surface, and a saw fence, that is, a vertical work guide surface, for a workpiece to be cut. The size of the frame varies with the model and manufacturer of the saw. The portable saw 26 is attached on the support plate 28 using screws, bolts or other fasteners. The support plate 28 is sufficiently wide to accept a wide variety of saws of different models from different manufacturers. Motion of the support plate 28 is controlled by a linear guide, for example, a dovetail joint between the support plate 28 and an upper surface 57 of a base or main beam 66. The support plate 28 has left and right edges 50, 52, respectively, that form inner sides of the dovetail joint. Outer sides of the dovetail joint are located on side edges of respective left and right guides 54, 56. The support plate 28 has a through hole or slot 29 (FIGS. 1, 3) adjacent its front edge that functions as a handle and permits the support plate and saw to be more easily maneuvered and carried. The support plate 28 is movable generally horizontally in a direction perpendicular to a length of the main beam 66. Locking screws 58, 59 are threaded through respective guides 54, 56 and push against a top surface of the support plate 28, thereby locking the support plate 28 at a desired position with respect to the saw table 20. Thus, the support plate 28 provides a universal receptor for various saws 26 and permits a wide variety of saws to be precisely located on the saw table 20. The support plate 28 can be made of any suitable rigid material, for example, aluminum, a carbon fiber or a LEXAN plastic or another metal or plastic material.

The guides 54, 56 are attached to an upper surface 57 of a main beam 66. The main beam 66 is a tubular base or center member having a rectangular cross-sectional profile, for example, 2×5 inches, and can be made from any suitable material that provides a sufficiently rigid beam, for example, an extrusion of aluminum, plastic, plastic reinforced fiber or other metal or material.

Figure 2:
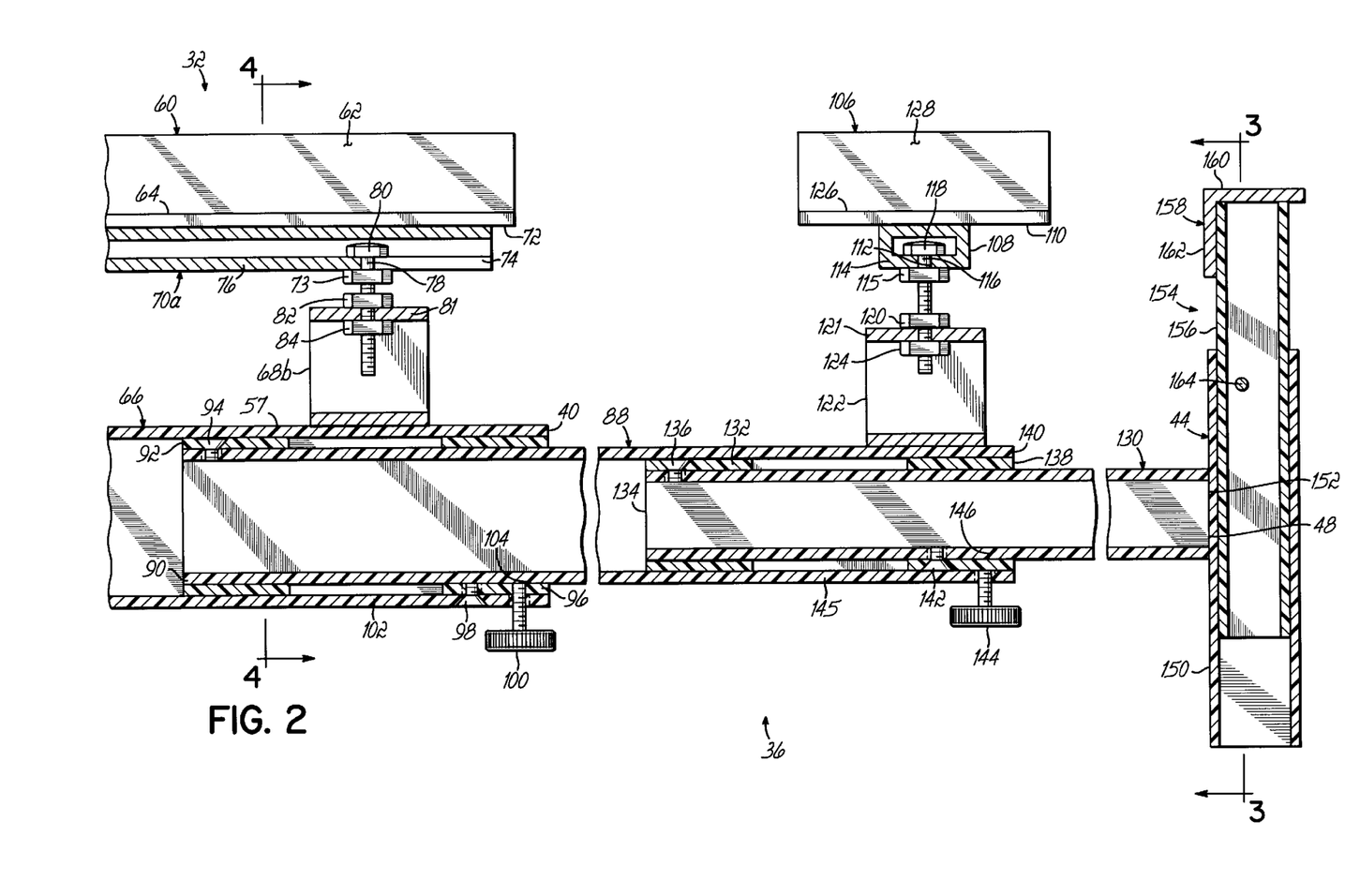
FIG. 2 is a partial centerline cross-sectional view of a right end of the portable saw table of FIG. 1.
Figure 4:
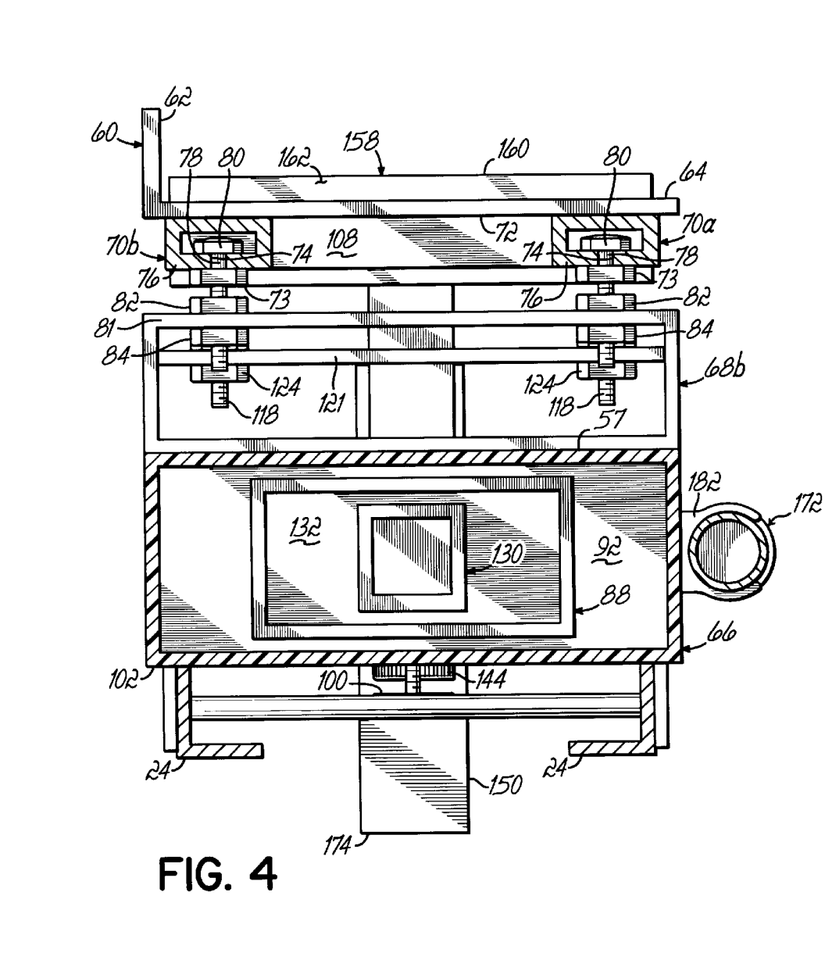
FIG. 4 is a cross-sectional view taken along line 4—4 of FIG. 2.

The right workpiece support 32 has an angle member 60, for example, a right angle made from an extrusion of aluminum, plastic, plastic reinforced fiber or other metal or material. The angle member 60 has a substantially vertical surface 62 of about 2 inches functioning as a fence and a substantially horizontal, adjustable workpiece support surface 64 of about 5 inches. As shown in FIGS. 2 and 4, the angle member 60 is supported on the main beam 66 by a pair of spacer blocks 68a, 68b and a pair of mounting brackets 70a, 70b. The mounting brackets 70 are tubular with a rectangular cross-sectional profile, for example, about 0.5×1 inches, and can be made from any suitable material, for example, an extrusion of aluminum, plastic, plastic reinforced fiber or other metal or material. Each of the mounting brackets 70a, 70b is rigidly connected to, and extends longitudinally along, a bottom surface 72 of the angle member 60. The mounting brackets 70 may be welded, fastened, bonded or otherwise rigidly connected to the angle member 60.

Each end of the mounting brackets 70 has a slot 74 cut into a bottom surface 76. The slot 74 has a width slightly larger than a square portion 78 beneath a head of a respective carriage bolt 80. Thus, the four carriage bolts 80 supporting the angle member 60 can slide, but not rotate, relative to a respective mounting bracket 70. Each of the carriage bolts 80 is threaded through a respective lock nut 73. The four carriage bolts 80 and respective lock nuts 73 permit the angle member 60 to be moved longitudinally or lengthwise parallel to a length of the main beam 66 and locked at a desired longitudinal position with respect to the portable saw 26. Each of the four carriage bolts 80 is also threaded through a respective height adjusting nut 82, extends through an upper wall 81 of a respective spacer block 68 and is threaded through a respective jam nut 84 inside the respective spacer block 68. Thus, by manipulating the nuts 82, 84 on one or all four of the carriage bolts 80, the height of the angle member 60 is adjustable with respect to the portable saw 26. The spacer blocks 68 may be made from any suitable material, for example, from the same material as the main beam 66.

The right extendable workpiece support 36 has a middle beam 88 with a proximal end 90 that is located in a right end 40 of the main beam 66. The middle beam 88 is tubular with a rectangular cross-sectional profile and can be made from any suitable material that provides a sufficiently rigid beam, for example, an extrusion of aluminum, plastic, plastic reinforced fiber or other metal or material. The middle beam proximal end 90 is disposed inside a bushing or glide 92 that surrounds all sides of the middle beam 88. The glide 92 is connected to the middle beam 88 by any suitable means, for example, one or more fasteners 94, bonding, welding, etc. The glide 92 has an outer cross-sectional profile that is substantially identical to, but slightly smaller than, an inner cross-sectional profile of the main beam 66. The glide 92 is made from a low friction material, for example, a plastic or metal material, so that it slides smoothly but with little play inside the main beam 66.

A second glide 96 that is identical to the glide 92 is mounted inside the right end 40 of the main tube 66. The glide 96 is rigidly connected to the main tube 66 by an suitable means, for example, one or more fasteners 98, bonding, welding, etc. The glide 96 has an inner cross-sectional profile that slidingly receives the middle beam 88. Thus, the glides 92, 96 provide the necessary support for the middle beam 88 as it is pulled out of and pushed into the main beam right end 40. As the middle beam 88 is extended from the main beam 66, the glide 92 moves to the right as viewed in FIG. 2 and contacts the glide 96. The glide 96 thus provides a positive stop that limits the extension of the middle beam 88 from the main beam 66. An adjusting screw 100 is threaded through a bottom wall 102 of the main beam 66 and extends through a clearance hole 104 in the glide 96. When the extendable workpiece support 36 is moved to its desired position, the locking screw 100 clamps against the middle beam 88, thereby locking the extendable workpiece support 36 at its desired position.

The extendable workpiece support 36 includes an angle member 106 that is made from substantially the same material as the angle member 60. A mounting bracket 108 is rigidly connected to a bottom surface 110 of the angle member 106. The mounting bracket 108 is made from substantially the same material as the mounting bracket 70 and has slots 112 in a bottom wall 114. The slots 112 extend inward from the ends of the mounting bracket 108 and have a width slightly larger than square portions 116 of two carriage bolts 118. Therefore, the carriage bolts 118 can slide, but not rotate, within the respective slots 112. Each of the carriage bolts 118 extends through a respective locking nut 115. After the angle member 106 has been moved forward or backward, that is, horizontally in a direction perpendicular to its length, to a desired position, tightening the locking nuts 115 secures the angle member 106 at the desired position. Thus, the angle member 106 can be moved with respect to the saw table 20 in order to align a substantially vertical, extendable fence 128 with the vertical surface 22.

Each of the carriage bolts 118 extends through a respective height adjusting nut 120, a clearance hole in an upper wall 121 of a spacer block 122 and a jam nut 124. The structure of the carriage bolt 118, nuts 120, 124 and spacer block 122 are substantially identical to the structure and components described with respect to the spacer blocks 68. Thus, the nuts 120, 124 can be manipulated to adjust the elevation of the angle member 106 and a substantially horizontal, extendable work surface 126 to an elevation that matches the height of the work support surface 64. Once the angle member 106 of the extendable workpiece support 36 is horizontally and vertically aligned with the right workpiece support 32, the workpiece support 36 may be extended lengthwise or longitudinally to any desired position permitted by the relative position of the glides 94, 96.

If it is desired to provide additional support for a long workpiece, the saw table 20 has an extendable end support 44 with an inner beam 130 that is located within the middle beam 88. The inner beam 130 is tubular with a rectangular cross-sectional profile and can be made from any suitable material that provides a sufficiently rigid beam, for example, an extrusion of aluminum, plastic, plastic reinforced fiber or other metal or material. A first glide 132 is mounted on a proximal end 134 of the inner beam 130. The glide 132 has an outer cross-sectional profile that is slightly smaller than an inner cross-sectional profile of the middle beam 88, thereby permitting the glide 132 to slide smoothly within the middle beam 88 with little play. The glide 132 is connected to the inner beam 130 by any suitable means such as one or more fasteners 136, bonding, welding, etc.

A second glide 138 identical to the glide 132 is mounted at the distal end 140 of the middle beam 88. The glide 138 is rigidly connected to the middle beam 88 by any suitable means such as one or more fasteners 142, bonding, welding, etc. The glide 138 has an inner cross-sectional profile that is slightly larger than an outer cross-sectional profile of the inner beam 130, thereby permitting the inner beam to slide smoothly and securely through the guide 138. Thus, the glides 132, 138 provide the necessary support for the inner beam 130 as it is pulled out of and pushed into the middle beam 88. The glide 138 also provides a positive stop for the glide 132, thereby limiting the lengthwise extension of the inner beam 130 from the middle beam 88.

A locking screw 144 is threaded through a middle beam lower wall 145 and extends through a clearance hole 146 in the glide 138. Thus, tightening the locking screw 144 brings it into contact with the inner beam 130, thereby permitting the inner beam to be locked at a desired position. Loosening the locking screw 144 releases the inner beam 130 for further adjustment.

Figure 3:
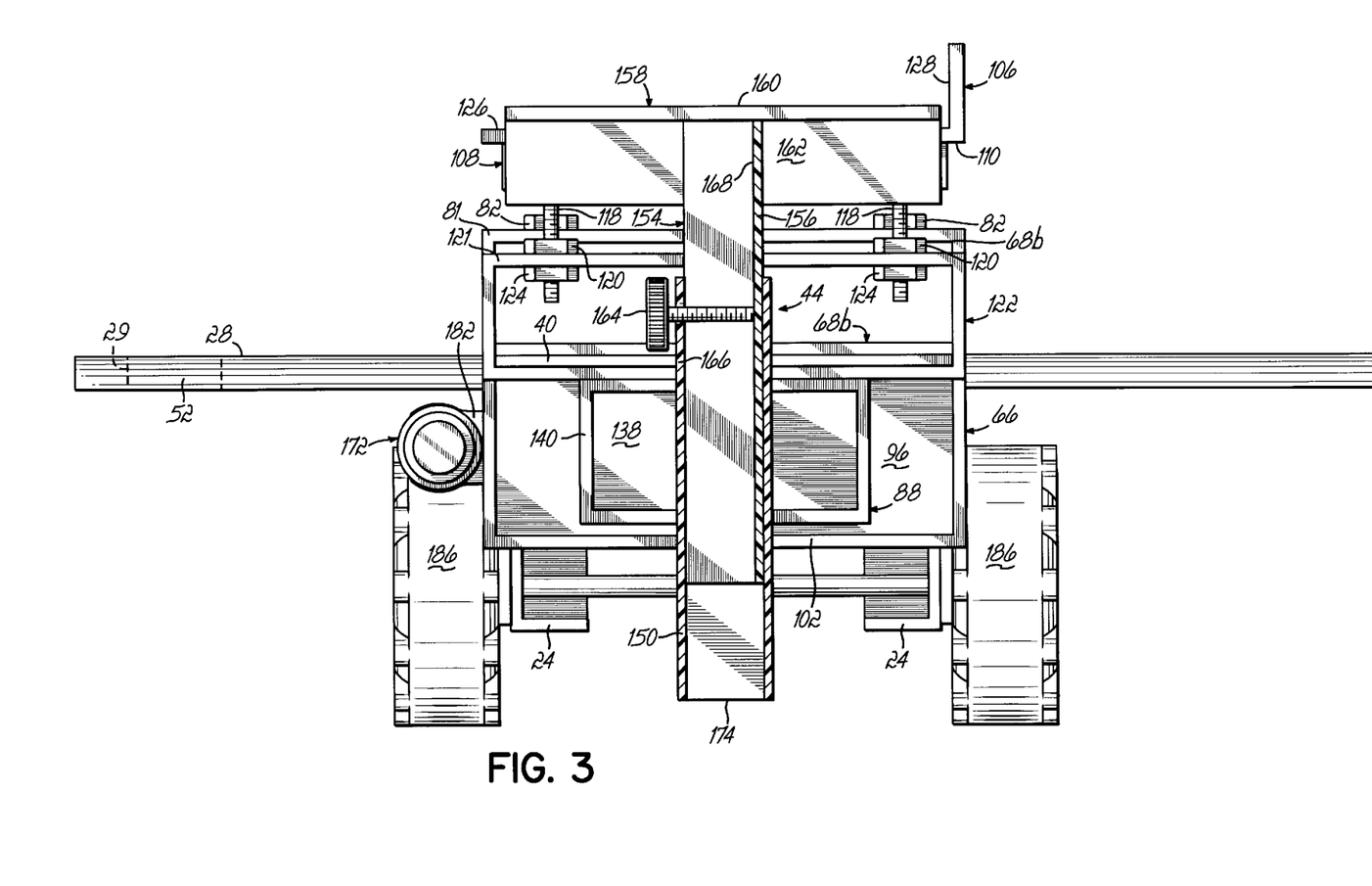
FIG. 3 is a cross-sectional view taken along line 3—3 of FIG. 2.

Referring to FIGS. 2 and 3, a guide 150 is rigidly attached at a distal end 152 of the inner beam 130. The guide 150 is a tubular member and may be made from the same material as the inner beam 130. An end support/stop 154 is comprised of a U-channel 156 and an angle piece 158. The channel 156 slides inside the guide 150. The angle piece 158 has a substantially horizontal workpiece supporting end surface 160 and a substantially vertical stop surface 162. A locking screw 164 is threaded through a guide side wall 166. Tightening the locking screw 164 brings it into contact with an inner surface of a channel wall 168, thereby locking the angle piece 158 at a desired elevation. Such elevation may bring the workpiece support surface 160 into a coplanar relationship with the workpiece surface 126. Alternatively, the desired elevation may raise the stop surface 162 above the workpiece support surface 126, thereby providing an end stop for a workpiece.

Referring to FIG. 1, end legs 172 are provided to give additional vertical support for the extendable end supports 42, 44. An upper end 170 of the end leg 172 is inserted into a lower end 174 of the guide 150. The end leg 172 is comprised of two telescoping upper and lower support rods 176, 178, respectively. A compression nut 180 is used to lock the support rods 176, 178 at a desired relative position. Each end leg 172 is stored in a pair of storage clips 182 that are mounted on an exterior surface of the main beam 66.

The construction of the left workpiece support 30, left extendable workpiece support 34 and left extendable end support 42 are identical to, but the mirror image of, the right workpiece support 32, the right extendable workpiece support 36 and the right extendable end support 44, respectively. Therefore, given the following detailed description of the structure of the right end of the saw table 20, the structure on the left end 38 of the saw table 20 is readily duplicated by one who is skilled in the art.

Figure 5:
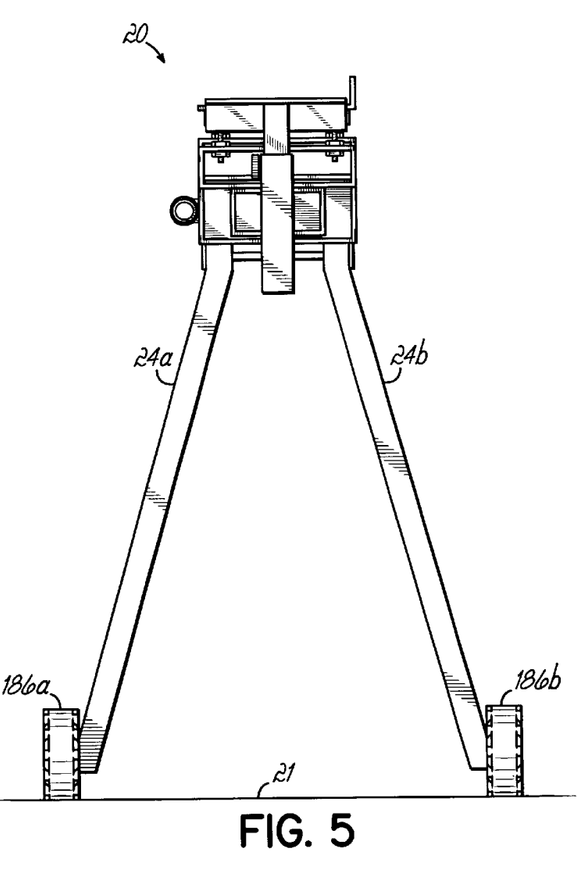
FIG. 5 is an end view of the portable saw table of FIG. 1 with its legs unfolded and the saw mounting plate removed.

The saw table 20 and the support plate 28 with the saw 26 mounted thereon can be easily carried to a worksite using the respective handles 184, 29. When at a worksite, the pairs of legs 22, 24 are easily and quickly pivoted from their folded position to a position where they are generally at right angles to the main beam 66. For example, as shown in FIG. 5, a pair of legs 24a, 24b open to form an inverted V-shape and are maintained in that position by the weight of the table 20. Each of the legs 24a, 24b has a respective wheel 186a, 186b. The construction of the pair of legs 22 is the same as the pair of legs 24 except that the pair of legs 22 do not have wheels at their distal ends. Further, as will be appreciated, the wheels 186 may also be omitted from the pair of legs 24. The saw table is then lifted so that the pairs of legs 22, 24 are resting on the ground or floor surface 21.

The portable saw 26, that has been mounted on the support plate 28 using appropriate fasteners, is positioned such that the plate edges 50, 52 align with the guides 54, 56. The support plate 28 supporting the saw 26 is then slid between the guides 54, 56 to a desired position. The support plate 28 is movable substantially horizontally in a direction perpendicular to a length of the main beam 66. Often, the saw 26 has its own fence or vertical guide surface; and the support plate 28 is adjusted front to rear until the saw fence aligns with the vertical guide surfaces 62 of the left and right workpiece supports 30, 32. The portable saw 26 and support plate 28 are then locked in that position using locking screws 58, 59. The use of the support plate 28 permits a common mechanical interface between the portable saw 26 and the saw table 20. The support plate 28 can be drilled with different hole patterns that permit a wide variety of portable saws 26 to be mounted thereon. However, regardless of the portable saw 26 used, the support plate 28 mounts to the saw table 20 using the same guides 54, 56.

The saw 26 also has a horizontal support surface or table and the length of the table will vary from saw to saw. Therefore, the locknuts 82, associated with each of the four carriage bolts 80 on each of the workpiece supports 30, 32, are loosened. The angle member 60 on each of the workpiece supports 30, 32 is then moved to bring a respective horizontal workpiece support surface 64 immediately adjacent one end of the table of the saw 26. The height adjusting and jam nuts 84, 86 are then manipulated on each of the carriage bolts 80 so that the workpiece support surfaces 64 are moved into alignment with the table of the saw 26. Thereafter, the locking nut 115 on the extendable end support 36 is loosened to align the substantially vertical, extendable fence surface 128 with the fence surface 62 of the workpiece supports 30, 34. In addition, the height adjusting and jam nuts 120, 124 are manipulated such that the horizontal work support surface 126 aligns with the workpiece support surface 64.

Thereafter, the locking screws 100, 144 are loosened and the extendable workpiece supports 34, 36 and end supports 42, 44 are extended to accommodate the length of the workpiece. When the extendable supports 34, 36, 42, 44 are located in their desired positions, the locking screws 100, 144 are then tightened. With the extendable supports 34, 36, 42, 44 fully extended, the saw table 20 can support workpieces that are at least 8 feet long on both the left or right sides of the saw 26.

Thus, the adjustable work supports 30, 32 are movable horizontally lengthwise and vertically, so that they can be precisely aligned with respective table and fence surfaces of the portable saw. Further, the extendable work supports 34, 36 are movable in three mutually perpendicular directions, so that horizontal and vertical surfaces 126, 128, respectively, can be aligned with respective horizontal and vertical surfaces 64, 62 respectively, on respective adjustable work supports 30, 32. In addition, the extendable end supports 42, 44 are movable horizontally lengthwise and vertically to locate the support and stop surfaces 160, 162, respectively, at a desired position. The various degrees of freedom of the adjustable components of the saw table 20 provides great flexibility and utility thereto.

If desired, the end support leg 172 is removed from its storage clips 182 and mounted beneath the end supports 42, 44 to provide additional vertical support for the fully extended saw table 20. Using the locking screw 164, the angle piece 158 is moved to its desired elevation to provide either a subjacent workpiece support or a workpiece end stop. If it is desired to move the fully assembled worktable from one location to another, the end support legs 172 are removed and one end 38 of the saw table 20 is lifted. Wheels 186 on the pair of legs 24 of the opposite end of the saw table 20 permit the saw table to be moved or rolled to other locations.

At any time, the portable saw 26 and support plate 28 can be quickly removed from the saw table 20 by loosening locking screws 58, 59 and pulling the support plate 28 off of the saw table 20 using the slot handle 29. Thus, the portable saw 26 and support plate 28 can be readily transported to another location for use. The mounting of the portable saw 26 on the support plate 28 does not impair other uses of the portable saw 26. The portable saw 26 and support plate 28 can be easily and quickly remounted on, and properly aligned with, the saw table 20. Locking screws 58, 59 are tightened to secure the saw 26 and support plate 28 in the desired aligned position. When the job is complete, the portable saw 26 and support plate 28 are removed from the guides 54, 56. The end legs 172 are collapsed and stored in their clips 182. The extendable work supports 34, 36 and end supports 42, 44 are collapsed and locked into the main beam 66 with locking screws 100, 144. It should be noted that, in its collapsed position, the end supports 42, 44 fit beneath the ends of the extendable supports 34, 36. The pairs of legs 22, 24 are folded together, and the locking tab 188 is released, so that the collapsed pairs of legs 22, 24 may be pivoted and folded back against the lower side of the main beam 66.

When fully collapsed, the saw table 20 is a generally rectangular, light weight, compact package that has a cross-sectional profile of approximately 7 inches by 10 inches and a length of approximately 7 feet. Thus, the portable saw 26 fits in a pickup truck bed for easy transportation. Not being encumbered by the weight of the portable saw 26, the saw table 20 can also be easily carried using a handle 184 mounted on the side of the main beam 66. Thus, the saw table 20 is especially useful in both commercial and residential construction environments for cutting interior and exterior trim, siding, conduit, pipe, etc.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, in the described embodiment, the main, middle and inner beams are made from rectangular tubular members. As will be appreciated, others structures may alternatively be used, for example, tubular members having other cross-sectional profiles, such as square, triangular, circular, oval, etc. Further, nontubular members may alternatively be used such as U-shaped, V-shaped, etc. or members that are solid and slide over one another.

In the described embodiment, the glides 92, 96, 132, 138 are used to provide support, bearing surfaces and stop surfaces between the stationary beam 66 and movable beams 88, 130. As will be appreciated, in alternative embodiments, such support, bearing and stop surfaces may be provided by many other components and structures. For example, instead of being a closed geometry, the glides could be formed from two opposed members that are connected to opposing walls of a respective beam. Alternatively, the glides could be opposed C-shaped members. The glides 92, 96, 132, 138 92 can be made from any low friction material that provides the necessary strength and wear characteristics.

In the described embodiment, a height adjusting capability is provided by height adjusting and jam nuts on the carriage bolts 80; however, as will be appreciated, there are many other arrangements and designs for adjusting the height of the various horizontal workpiece support surfaces. For example, screw fasteners could replace the carriage bolts, and the screws and/or carriage bolts 80 could be threaded into the top of the spacer blocks 68, 122. In the described embodiment, the support plate 28 is secured by locking screws 58, 59 extending through the guides 54, 56. As will be appreciated, in an alternative embodiment, locking screws or other locking devices may be mounted between the support plate 28 and the main beam 66 and used to secure the support plate 28 at its desired position.

In the described embodiment, the wheels 186a, 186b are mounted at the respective ends of the pairs of legs 24a, 24b. As will be appreciated, in an alternative embodiment, a single wheel can be mounted at the distal end of the pair of legs 24 and be movable into and out of contact with the ground 21, thereby permitting the saw table 20 to be elevated and moved like a wheelbarrow.

In the described embodiment, extendable work supports 34, 36 and extendable end supports 42, 44 are mounted with respect to each end of the main beam 66. As will be appreciated, in alternative embodiments, other configurations are evident to those skilled in the art. For example, only one extendable work support and extendable end support can be used, and such supports may be mounted at either end of the main beam 66. Further, only one of the adjustable work supports 30, 32 may be used. Further, an extendable work support and extendable end support may be mounted on the same side of the support plate as an adjustable work support or on an opposite side of the support plate as the adjustable work support.

Therefore, the invention in its broadest aspects is not limited to the specific details shown and described. Consequently, departures may be made from the details described herein without departing from the spirit and scope of the claims which follow.

What is claimed is:

1. A portable saw table for supporting a portable saw, the portable saw table comprising:
    a base;
    a plate removably mountable on the base and adapted to be attached to the portable saw;
    an adjustable work support mounted on the base adjacent the plate, the adjustable work support having a substantially horizontal, adjustable work support surface, and the adjustable work support surface being adjustable substantially horizontally along a length of the adjustable work support and adapted to be aligned with the portable saw; and
    an extendable work support slidably mounted with respect to the base.

2. The portable saw table of claim 1 wherein the adjustable work support surface is adjustable in a substantially vertical direction.

3. The portable saw table of claim 1 wherein the adjustable work support surface is adapted to be adjustable to a position immediately adjacent the portable saw.

4. The portable saw table of claim 1 wherein the extendable work support is adjustable substantially horizontally along a length of the base.

5. The portable saw table of claim 4 wherein the extendable work support has a substantially horizontal, extendable work support surface, and the extendable work support surface is adjustable to a position substantially aligned with the adjustable work support surface of the adjustable work support.

6. The portable saw table of claim 5 wherein the extendable work support surface is adjustable in a substantially vertical direction.

7. The portable sawtable of claim 5 further comprising an extendable end support mounted with respect to the extendable work support and adjustable along a length of the extend able work support.

8. The portable saw table of claim 7 wherein the extendable end support has a substantially horizontal, extendable end surface, and the extendable end surface is adjustable to a position substantially aligned with the extendable work support surface of the extendable work support.

9. The portable saw table of claim 8 wherein the extendable end surface is adjustable in a substantially vertical direction.

10. The portable saw table of claim 8 wherein the extendable end support has a stop surface substantially perpendicular to a length of the extendable workpiece support.

11. A portable saw table for supporting a portable saw having a substantially vertical saw fence, the portable saw table comprising:
    a base;
    a plate removably mountable on the base and adapted to be attached to the portable saw;
    an adjustable work support mounted on the base adjacent the plate, the adjustable work support having a substantially vertical guide surface, and the vertical guide surface adapted to be in alignment with the saw fence; and
    an extendable work support slidably mounted with respect to the base and having a substantially vertical extendable fence.

12. The portable sawtable of claim 11 wherein the plate is adjustable with respect to the adjustable work support and is adapted to bring the saw fence in a substantially aligned relationship with the vertical guide surface of the adjustable work support.

13. The portable saw table of claim 12 wherein the extendable fence is adjustable to bring the extendable fence in a substantially aligned relationship with the vertical guide surface of the adjustable work support.

14. The portable saw table of claim 13 wherein the extendable fence is adjustable substantially horizontally in a direction substantially perpendicular to a length of the base.

15. The portable saw table of claim 11 further comprising:
an extendable end support mounted with respect to the extendable work support and adjustable along a length of the extendable work support.

16. The portable saw table of claim 15 wherein the base comprises a tubular main beam and the extendable work support is mounted to slide in one end of the tubular main beam.

17. The portable saw table of claim 15 further comprising a first glide disposed between the tubular main beam and the extendable work support.

18. The portable saw table of claim 17 wherein the extendable work support comprises a tubular middle beam and the extendable end support is mounted to slide in one end of the tubular middle beam.

19. The portable saw table of claim 18 further comprising a second glide disposed between the tubular main and middle beams.

20. The portable saw table of claim 19 wherein the extendable end support comprises a tubular inner beam.

21. The portable saw table of claim 15 further comprising two pairs of legs connected to the base at spaced apart locations along a length of the base, the pairs of legs supporting the base at a desired elevation.

22. The portable saw table of claim 21 wherein the pairs of legs are movable between a folded position and an unfolded position.

23. The portable saw table of claim 21 wherein one of the pair of legs has a wheel rotatably attached to each leg.

24. The portable saw table of claim 21 wherein the pairs of legs have an inverted V-shape.

25. A portable saw table for supporting a portable saw, the portable saw table comprising:
a base;
a plate removably mountable on the base and adapted to be attached to the portable saw;
a pair of linear guides mounted to the base and spaced apart to receive and guide opposed edges of the plate and position the plate at a desired location, the plate being easily removable from the table and thereafter, the guides relocating the plate on the table at the desired location;
an adjustable work support mounted on the base adjacent the plate; and
an extendable work support slidably mounted with respect to the base.

26. The portable saw table of claim 25 wherein the plate is movable substantially horizontally in a direction substantially perpendicular to a length of the base.

27. The portable saw table of claim 25 further comprising a locking device for securing the plate at a desired position with respect to the base.

28. The portable saw table of claim 27 further comprising a locking screw threadedly mounted in one of the linear guides and movable into and out of contact with the plate.

29. The portable saw table of claim 28 wherein the pair of linear guides and the opposed edges of the plate form a dovetail joint.

30. The portable saw table of claim 28 further comprising a pair of locking screws, each of the locking screws being threadedly mounted in one of the linear guides, the locking screws being movable into and out of contact with the plate.

* * * * *